Figure 1:
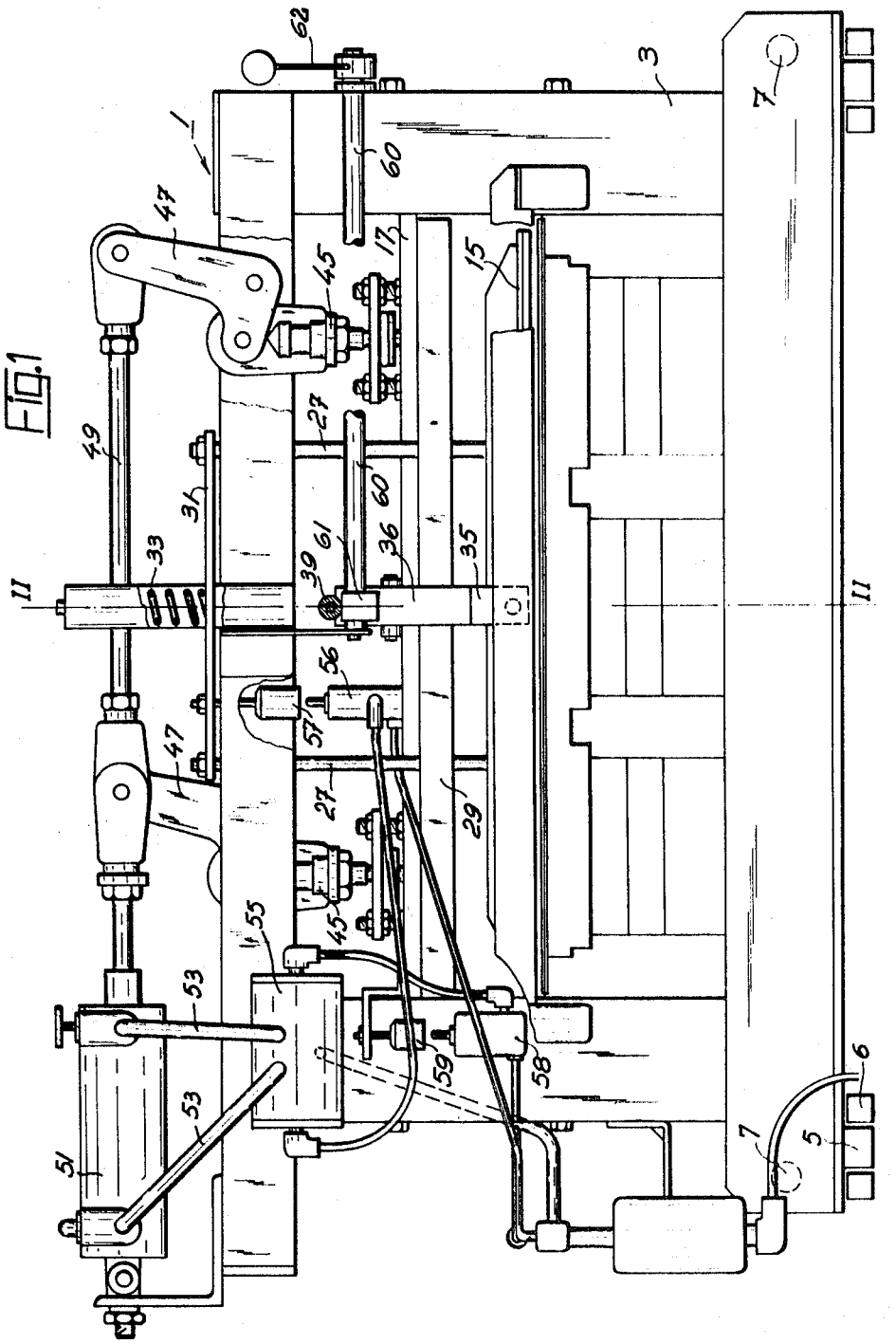

United States Patent

[11] 3,603,188

[72] Inventor Richard Rabl
Vienna, Austria
[21] Appl. No. 850,471
[22] Filed Aug. 15, 1969
[45] Patented Sept. 7, 1971
[73] Assignee Firma Akkumulatorenfabrik Dr. Leopold Jungfer
[32] Priority Nov. 11, 1968
[33] Austria
[31] A 10969/68

[54] CUTTING DEVICES
7 Claims, 2 Drawing Figs.
[52] U.S. Cl. ............................................. 83/262,
83/68, 83/380, 83/389, 83/517
[51] Int. Cl. ......................................... B26d 5/26,
B26d 7/02
[50] Field of Search ............................ 83/68, 262,
380, 389, 516, 517

[56] References Cited
UNITED STATES PATENTS
1,567,919  12/1925  Cumfer ..................... 83/389 X

| 1,776,861 | 9/1930 | Leichner ..................... | 83/517 |
| 2,017,752 | 10/1935 | Fisher ........................ | 83/516 X |
| 2,251,153 | 7/1941 | Munschauer ................ | 83/389 |

Primary Examiner—Frank T. Yost
Attorney—Ernest F. Marmorek

ABSTRACT: A cutting device for accurate continuous cutting of inherently stiff but flexible strip materials, particularly a sintered plastics powder strip. The device employs two intermittently actuated clamp knife systems adjustable in relation to one another in the travel direction of the strip. A spring-loaded movable clamp in the first system is provided with a one-way coupling member which is locked at the starting position of the systems. Upon triggering of the locked one-way coupling member, the two knives are simultaneously activated. A spring-loaded movable clamp in the second system is directly coupled to the second knife for both directions of its travel. An adjustable feeding device controls the feed of the strip material and the trigger member of the device.

CUTTING DEVICES

This invention relates to a cutting device for accurately cutting into lengths strips of inherently stiff, but flexible, material (particularly a sintered plastics powder strip) fed forward continuously.

Separators for accumulators, for example, are made from sintered plastics powder strip. Hitherto it has been usual, for cutting separators or the like from a strip of material, to use a single cutting device with an intermittently actuated clamp knife arrangement. In this case the strip of material fed forward by a continuously acting forward feed device is intermittently held by the clamp in accordance with the working sequence of the device, and during each clamping period a portion of the strip of the desired length is cut off.

The working rhythm of the device and hence the length of the portion of the strip of material to be cut off, is adjustable by means of an infinitely variable regulation gear system. Because of the continuous forward feed of the strip of material and the intermittent actuation of the cutting device there is formed at each cut a small corrugation of the flexible strip of material at the entry side of the cutting device.

In the case of special constructions of accumulators the separators must have unusually large dimensions and accurately parallel cutting edges, in order to avoid difficulties with the electrode sets of the accumulators during automatic assembly.

In the case of the known cutting devices however, because of the variations, which in practice are unavoidable even if they are only slight, in the forward feed speed of the strip of material, or because of unavoidable failures in synchronization of the rhythmic sequence of the cutting device, the maintenance of precisely uniform cutting pitches or the maintenance of precisely parallel cut edges, is not ensured.

The invention is therefore directed to providing a cutting device, by using an intermittently actuated clamp knife system, so constructed that by means of its assistance strip portions of precisely uniform length can be cut from the material strip, and this is effected by the intermittently actuated clamp knife system comprising two clamp knife units adjustable in relation to one another in the forward feed travel direction of the material strip and fixable at the desired distance apart, the movable knives of which can be actuated simultaneously.

The adjustability of one clamp knife unit in relation to the other makes it possible to adjust the dimensions of the strip portions to be cut into lengths, as desired, and through the simultaneous actuation of the two knives variations in the cutting pitch are excluded.

When using such a cutting device there is admittedly obtained at each double cut a waste strip, but this can be kept very small and in many cases, for instance in the case of thermoplastic material, the waste can be melted and used again.

In a preferred embodiment of the invention the arrangement is such that the instant of actuation of the clamp of the first clamp knife unit can be controlled, that a device for initiating the actuation of the movable knife of the two units in dependence on the actuation of this first clamp is provided, that the clamp of the second clamp knife unit is in effective connection with the movable knife of this unit and in dependence on the actuation of the knife can be actuated in the lead of this, and that the clamps of the two units can be coupled with the associated movable knives for entrainment during their return movement.

Figure 2:
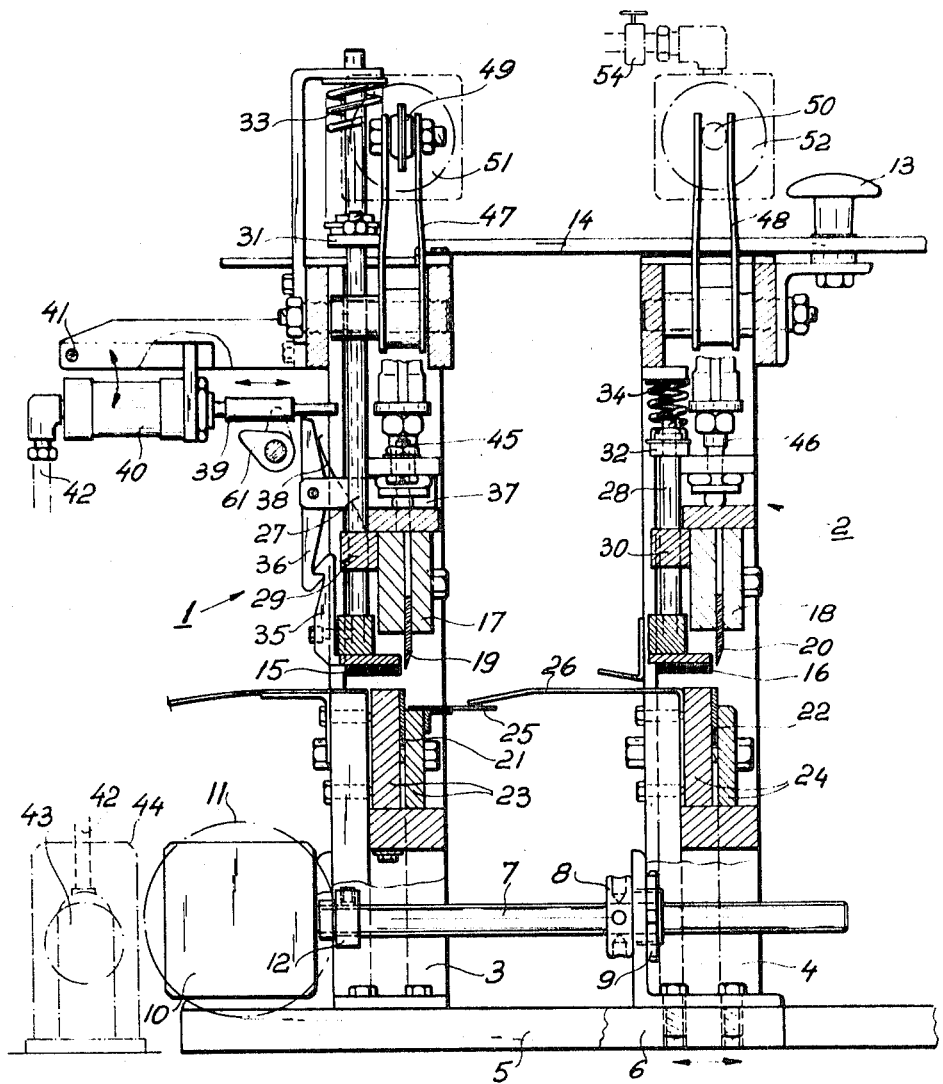

A specific embodiment of the invention will now be described by way of example with reference to the accompanying drawing, in which:

FIG. 1 shows a cutting device embodying the invention, viewed in the direction of the material strip entry (into the first clamp knife unit), and FIG. 2 shows a section through the device taken along the line II—II in FIG. 1.

The cutting device represented in FIGS. 1 and 2 essentially consists of two clamp knife units 1 and 2 arranged at a distance apart from one another in the forward feed direction of the material strip, and associated frames 3 and 4. The frame 3 is advantageously fixedly connected to a support 5, and the frame 4 with the second clamp knife unit 2 is arranged to be movable and fixable on the support 5 by means of lateral sliding guides 6 in respect of the frame 3 for the first clamp knife unit 1, so that the cutting device can be adjusted to different cutting pitches.

The second clamp knife unit 2 is brought to the desired distance from the first clamp knife unit 1 by means of a handwheel 11 controlling a bevel gear system 10 (fixedly connected to the frame 3) and two spindles 7 (FIG. 2), provided one on each side of the device and supported in the frame 3 of the first clamp knife unit 1. Which spindle is rotatably supported in the frame 4, and is coupled to the said frame 4 by means of a fixing nut 8, adjustable for the purpose of trueing, and fixed by a counter nut 9. There is further provided on the spindle 7, applied against the frame 3, a nut 12 for the purpose of preventing any axial play of the spindle.

To avoid the effects of vibration and additional fixing of the two units 1 and 2 in their relative position is possible by means of a connecting arm 14 connecting the upper parts of the frame and fixable by means of a star wheel 13.

Each clamp knife unit 1, 2 has clamp 15, 16 respectively arranged above the material strip plane of the device and movable in the vertical direction, and also likewise vertically movable knife bars 17, 18 respectively, guided in sliding guides or radius links at the frame 3 or 4 respectively, with in each case an interchangeable knife 19 or 20 respectively, whose cutting edge lies offset in the vertical direction from the contact pressure surface of the clamp, each knife bar 17 or 18 respectively cooperating with a shearing bar 21 or 22 respectively, fixed below the material strip plane. The shearing bars 21 and 22 are chucked interchangeably in holding members 23 and 24 (connected to the frames 3 and 4 respectively), the surfaces of which form part of the support surfaces supporting the strip of material. There is provided on the holding member 23 (or at the frame 3) at the output side of the first clamp knife unit 1 a bracket 25, while at the input side of the second clamp knife unit 2 at the frame 3 is fixed a support surface 26 for the strip of material. The support surface 26 overlaps the bracket 25, slides with a displacement of the second clamp knife unit 2 on the bracket and supports the particular portion of the material strip located in the zone between the two units. Each clamp 15 or 16 is respectively connected with two vertically arranged actuating rods 27 and 28 respectively, which are guided in sliding guides (radius links) 29 and 30 respectively, fitted to the knife bar 17 or 18 respectively, and intercoupled by a transverse bar 31 or 32 respectively, which is continuously under the action of a spring 33 or 34 respectively supported against the frame 3 or 4 respectively.

The actuating rods 28 of the second clamp 16 are shorter than the rods 27 of the first clamp 15 and the second knife bar 18 forms at its upper end a stop surface for the transverse bar 32 of the second clamp 16.

There is fixed to the clamp 15 of the first clamp knife unit a rigid hook 35, which is in engagement with a pawl 36 articulated by a component 37 to the knife bar 17, the said pawl 36 being under the action of a leaf spring 38 (FIG. 2) arranged at the knife bar 17, and locking the clamp in its raised position against the action of the spring 33. The pawl 36 can be actuated, that is, unlocked, by a piston rod 39 movable in the horizontal direction and having a shoulder. The piston of the piston rod 39 can be acted on by a working medium in a cylinder 40 pivotably supported on the frame 3 at 41, which working medium is fed from a source of medium to the cylinder 40 through a pipe 42 via a three-way regulating valve (represented diagrammatically in FIG. 2), actuated by a regulating gear 44.

Each knife bar 17 or 18 respectively is pivotally connected at two points lying symmetrically to the center plane of the device, in each case with a ram 45 or 46 respectively, which are carried by forked cranks 47 and 48 articulated on the frame 3 or 4 respectively. The two cranks of each frame are adjustably intercoupled by an articulated push rod 49 or 50 respectively. The push rods 49, 50 extend transversely to the material strip above the frames 3, 4 and are formed at their ends as piston rods, whose pistons are guided in each case in a double-acting working cylinder 51 or 52 respectively, arranged at the frame 3 or 4 respectively, and able to be acted on by a working medium. The working cylinders 51, 52 are connected via feedpipes 53, 54 with a four-way impulse valve 55 arranged at the frame 3, which valve in turn is connected with a source of working medium (not shown) through a pipe. There is further provided at the knife bar 17 of the first clamp knife unit 1 a three-way control valve 56, which can be actuated by a ram 57 mounted on the transverse bar 31 of the clamp 15 and is connected by pipes with the four-way impulse valve 55 and also with the source of pressure medium.

There is likewise provided on the frame 3 a second three-way control valve 58, which can be actuated by a ram 59 mounted on the knife bar 17, and likewise connected via appropriate pipes with the four-way impulse valve 55 and the source of working medium. In the transverse direction of the material strip input there is pivotably supported at the frame 3 a rod 60 carrying a cam 61, which is arranged below the piston rod 39 for actuating the pawls, and can be brought into engagement with the pawls by rotating the rod 60 by means of a hand-lever 62, by which the cylinder 40 can be swiveled around the point of articulation 41 and the pawls rendered nonoperative.

The whole cutting device slopes in relation to the outlet of the second clamp knife unit, preferably at an angle of 30°; this prevents the portions of the strip cut from the strip of material remaining in the cutting device.

The cutting device works as follows: after adjusting the second clamp knife unit 2 at a distance from the first clamp knife unit 1 corresponding to the desired cutting pitch, by means of the handwheel 11 and after further fixing of the second unit 2 by the star wheel 13 at the connecting arm 14, the material strip is continuously fed forward by the forward feed device through the gap formed by the clamps 15 and 16 on the one hand and the support surfaces 25 and 26 on the other hand, to an extent such that a short piece, corresponding at least to the tolerance allowed when using a single cutting device, projects beyond the cutting edge of the shearing bar 22 of the second unit 2. The speeds of the forward feed device and the regulating gear 44 of the cutting device are preferably so synchronized that the continuously rotating regulating gear actuates the regulating valve 43, which releases the feed of working medium to the cylinder 40 for actuating the pawls via the pipe 42, so that the piston rod 39 because of the piston thrust comes to rest with its shoulder against the pawl 36 articulated to the knife bar 17 and releases the said pawl from its locking position with the hook 35 at the clamp 15, by which the said clamp 15 is pressed under the action of the spring 33 against the strip of material and holds this fast against the supporting upper surface. Meanwhile the ram 57 mounted on the downward-moving clamp 15 actuates the three-way control valve 56 (arranged on the knife bar 17), which releases an impulse to the four-way impulse valve 55 provided on the frame and thereby sets the setting member of this valve to release the working medium feed to the pipes 53 and 54 of the working cylinders 51 and 52 of the two units 1 and 2. The pistons, acted on by the working medium, of the push rods 49, 50 produce a pivoting of the cranks 47 and 48 respectively, by which the knife bars 17 and 18 are simultaneously actuated, that is, lowered, via the associated rams 45 and 46 respectively.

The clamp 16 of the second clamp knife unit 2 is meanwhile, following the movement of the knife bar, pressed by the associated spring 34 against the strip of material, where because of the vertical offsetting of its contact pressure surface against the cutting edge of the knife 20 of the knife bar 18 it comes into engagement with the material strip in front of the knife. In the lowest position of the knife bar 17, the ram 59, provided at the first knife bar 17, actuates the three-way control valve 58 (at the frame 3), which emits an impulse to the four-way impulse valve 55 and whose setting member operates to release the working medium feed to the other side of the working cylinders 51, 52, by which the pushrods 49, 50 actuate, that is, lift, the knife bars 17, 18. During the upward movement of the two knife bars 17, 18, the clamps 15, 16 of the two units 1, 2 are simultaneously also coupled in entrainment with the knife bars, that is to say, the clamp 15 of the first unit 1 by the hooking-in of the pawl 36 (turned into its starting position by the leaf spring 38 during the downward movement of the clamp) into the rigid hook 35 fixed to the clamp 15, and the clamp 16 of the second unit 3 by the impact of the upper boundary surface of the knife bar 18 at the transverse bar 32 of the clamp 16.

After the cutting has been effected and the strip released by the clamp, the cutoff portion of the strip material slides automatically, because of the above-mentioned sloping arrangement of the whole cutting device, out of the gap (through which the material passes) in the device, upon which after a further forward feed of the material strip, a fresh working cycle is initiated by the regulating gear 44.

The manually operable cam 61 makes it possible to pivot the working cylinder 40 for actuating the pawls, during operation, and therefore to render the pawls actuation inoperative, so that in case of need the apparatus can be stopped.

Of course within the scope of the invention, a number of variations of the cutting device described above are possible. For instance, instead of the pneumatic control valves described, electrical switches could be provided which would release the setting movement of an electromagnetic valve provided instead of the four-way impulse valve. It is also possible, by means of an arrangement of fine-adjustment regulating valves (indicated in chain line in FIG. 2) at the pipes of the two working cylinders for actuating the knife bars, to regulate the feed of working medium to these cylinders in such a way that in certain circumstances the second knife unit cuts just in front of the first knife unit.

I claim:

1. A cutting device for accurately cutting into predetermined lengths continuously fed strip material, particularly a sintered plastics powder strip, comprising a first and a second clamp knife unit;

support frame means for supporting said first and second clamp knife units at an adjustable spaced relation to one another;

each of said clamp knife units having a stationary bottom portion and a movable top portion;

each of said stationary bottom portions being arranged for supporting said continuously fed strip material;

each of said top portions including a movable spring-loaded clamping member and a reciprocable knife member guided for movement parallel to said clamping member;

two-directional drive means coupled to said reciprocable knife members for driving simultaneously said knife members in said first and second clamp knife units from a starting position to a working position thereof and reversely, control switch means operatively coupled to said drive means for controlling the strokes and the dwell period of said knife members;

one-directional clamp coupling mechanism arranged in said first clamp knife unit between said clamping member and said knife member for restoring and locking the starting position of said clamping member in said first unit during the lift of said knife member;

two-directional clamp-coupling mechanism arranged for actuating said spring-loaded clamping member in said second unit by the action of said knife member in both directions of its travel; and trigger means for unlocking said one-directional clamp-coupling mechanism from said starting position.

2. A cutting device according to claim 1 wherein said control switch means comprises a control switch valve, first limit switch means coupled between said movable clamping member in said first unit and said control valve for releasing through said drive means the working stroke of said knife members upon clamping of said strip material in said first clamp knife unit; and second limit switch means associated with said knife member in said first unit and coupled to said control valve for returning via said drive means said knife members to their starting position.

3. A cutting device according to claim 2 wherein said two-directional drive means comprises two pneumatic cylinder piston units operating in parallel and having two pressure air inputs coupled to said control valve.

4. A cutting device according to claim 1 wherein said two-directional clamp-coupling mechanism in said second clamp knife unit carries said clamping member ahead of said knife member.

5. A cutting device according to claim 1 further comprising an adjustable feeding means for said strip material, said feeding means being operatively coupled to said trigger means for actuating the latter in dependence on a predetermined length of said strip material fed into the device.

6. A cutting device as claimed in claim 1, characterized in that there is provided on the entry side of the second clamp knife unit a supporting surface for the particular portion of the material strip located in the zone between the two units, which is supported if requisite from below by a bracket provided on the runout side of the first clamp knife unit.

7. A cutting device as claimed in claim 1, characterized in that the two clamp knife units are arranged in such a way that the material strip moves from the first unit to the second unit along a sloping sliding plane.